April 22, 1930.  J. C. OLSEN  1,755,304
FASTENER FOR BELTS AND THE LIKE
Filed Nov. 17, 1928
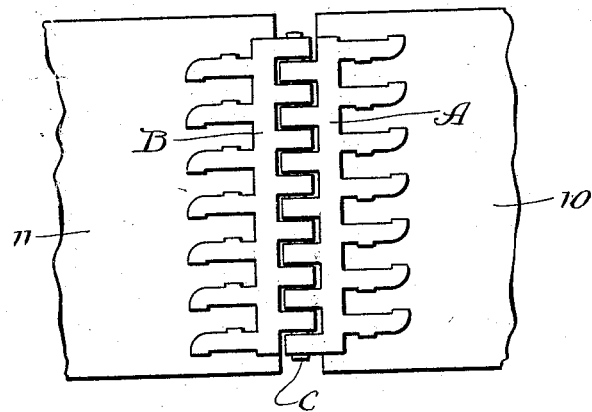
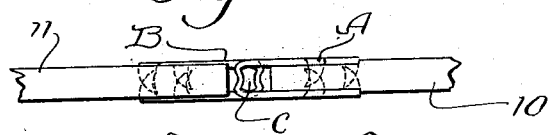
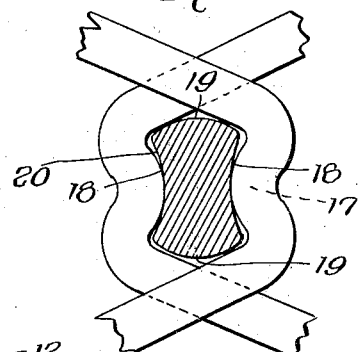
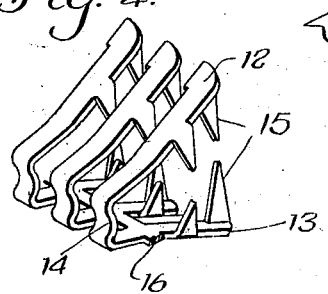
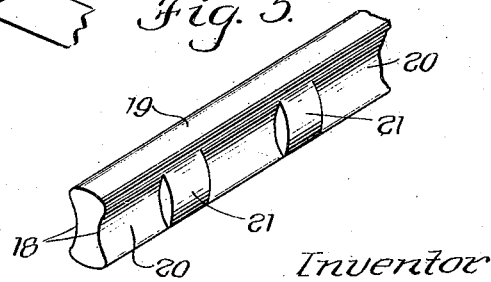
Witness
William P. Kilroy
Inventor
John C. Olsen
By Joseph Harris
His Atty.

Patented Apr. 22, 1930

1,755,304

UNITED STATES PATENT OFFICE

JOHN CONRAD OLSEN, OF CHICAGO, ILLINOIS, ASSIGNOR TO FLEXIBLE STEEL LACING COMPANY, OF CHICAGO, ILLINOIS, A CORPORATION OF ILLINOIS

FASTENER FOR BELTS AND THE LIKE

Application filed November 17, 1928. Serial No. 320,050.

This invention relates to improvements in fasteners for belts and the like.

In the art of belt fasteners of the so-called flexible or hinge type, it has long been recognized that the pin or pintle acting means are subject to relatively rapid wear due to the hinge elements of the fasteners continuously sliding circumferentially back and forth on the pin or pintles.

To eliminate or minimize this frictional wearing action, various expedients have heretofore been employed but, so far as I am aware, all such prior expedients have involved the use of a plurality of sections for the connecting pins or pintles, said sections being so combined with the usual interdigitated hinge members as to rock on each other during the flexing of the fasteners as the belt passes over the pulleys.

One object of my invention is to provide a fastener suitable for belts, conveyors and other like flexible power transmitters wherein a single hinge pin or pintle is employed with the hinge means and so coordinated therewith that frictional sliding of one part on the other is eliminated and wear thereby minimized.

Another object of my invention is to provide a flexible fastener employing a metal pin or pintle wherein a rocking action is obtained between the pin and each of the hinge members to thereby reduce the wear to a minimum.

Another object of my invention is to provide an arrangement of the character indicated in the two preceding paragraphs, wherein integral formations on the pin are adapted to cooperate with the hinge members for any width belt to prevent accidental disengagement of the pin when the fastener is under tension in service.

A further object of my invention is to provide a fastener of the character indicated in the preceding paragraphs such that the pin or pintle element may be manufactured of any desired length in an expeditious and inexpensive manner, the pin being adapted to be cut or broken at the proper length corresponding to the width of the belt, conveyor or the like, with which used.

Other objects of the invention will more clearly appear from the description and claims hereinafter following.

In the drawing forming a part of this specification, Figure 1 is a plan view of portions of adjacent ends of a belt showing my improvements in connection therewith. Figure 2 is an edge view of the belt and fastener illustrated in Figure 1. Figure 3 is an enlarged part end elevation and part sectional view of one form of belt fastener embodying my improvements, parts of the hinge members being broken away to better accommodate the view on the sheet. Figure 4 is a detail perspective of a portion of a strip of belt lacing of the special form used in my invention, and Figure 5 is a detail perspective of the novel hinge pin employed in my invention.

In said drawing, 10 and 11 illustrate the opposite end portions of a belt such as used for transmitting power. The improved fastener, as shown, comprises two hinge members A and B and a hinge pin C. The hinge members A and B are shown of the so-called lacing type and each comprises a series of loops, each loop having diverging jaws or arms 12 and 13 connected by an integral apex portion 14. As customary, each of the jaws or arms 12 and 13 is provided with clinching prongs 15—15 near the outer free ends thereof and which are adapted to be clinched through the ends of the belt, as best indicated in Figure 2. The series of loops or jaw sections is manufactured in continuous strips and the loops are integrally connected by narrow portions 16 so that, while the strip can be made of any desired length, best adapted for manufacturing purposes, nevertheless, it can be broken off at any one of the connecting portions 16 to thereby provide a lacing of the desired width corresponding to the belt with which used. When the loop or jaw portions of the hinge members are formed, the apex portions of each of the same will be provided with an inwardly extended convex offset indicated at 17, best shown in Figure 3, the latter in turn providing a rounded convex bearing surface 18 of relatively short radius and which bearing surface 18 will be presented inwardly, that is, toward the adjacent edge of that end of the belt to which the hinge member is clinched. When the hinge members are clinched to the belt, as shown best in Figure 2, it is evident that a series of alined loops will be formed, of a depth approximating the thickness of the belt and somewhat elongated in a direction lengthwise of the belt. The loops of one set of hinge means will be alternated or interdigitated with the loops of the opposite hinge means, as clearly shown in Figure 2, so that there will thus be presented, as best shown in Figure 3, two opposed series of the convex bearing surfaces 18.

The hinge pin C, as best shown in Figures 3 and 5, will preferably be made of steel and rolled and made of any desired length, best adapted for economical manufacture and it also may be broken off at any point to correspond with the width of belt with which used. Along each top and bottom edge, as viewed in Figure 3, the pin C will be provided with rounded surfaces 19—19. Along each side, the pin C will be formed with concave surfaces 20—20 of greater radius than the convex bearing surfaces 18, thus providing, along each side of the pin, concave bearing seats for the opposed sets of convex bearing seats 18 of the loop or hinge member. Also, as shown in Figures 3 and 5, the hinge pin C will be provided, preferably along one side only thereof, with a series of longitudinally spaced, outwardly extended lugs or shoulders 21—21 so spaced that the lugs 21 will come between pairs of the hinge loops. Preferably, there will be one lug 21 for each loop of the hinge member, although a lesser number may obviously be used.

In carrying out my invention, the hinge members are attached to the respective ends of the belt by any suitable means. The two sets of loops are then interfitted or interdigitated and the pin C then inserted lengthwise, it being understood that there is sufficient elongation of the respective loops lengthwise of the belts to permit the pin C being inserted with the shoulders 21 clearing the loops. After the pin has been inserted the proper amount and the shoulders 21 brought opposite their proper positions, the ends of the belt are then pulled apart, thus seating the shoulders and also bringing the convex bearing surfaces 18 into cooperative engagement with the corresponding opposed sets of concave bearing seats 20.

With the construction described, it is evident that each set of loops is adapted to rock on the corresponding set of cooperating concave bearing seats 20 of the pin C, as the belt passes over the pulley. By this construction, a rolling or rocking action takes place, thus minimizing the wear on the pin and thereby prolonging the life of the fastener. It is evident, also, that the cooperating sets of convex and concave bearing surfaces are so designed that the pin cannot turn or twist or get out of its proper position.

Although I have herein shown and described my improvements as specifically applied to belt fasteners of the so-called lacing type, nevertheless it will be understood by those skilled in the art that the improvements are equally adaptable to fasteners of other types, such as the individual wire hooks or staples and the like and also to other flexible connections such as employed with conveyors and belt-like power transmitters generally. It will further be understood that the specific arrangement which I have chosen for illustration is merely illustrative and that various changes and modifications may be made without departing from the spirit of the invention and all such changes and modifications are contemplated as come within the scope of the claims appended hereto.

I claim:

1. In a flexible fastener of the character described, the combination with interdigitated loop-like hinge means adapted to be secured to the opposite ends of a flexible power transmitter; of a single connecting pin extending through the loop-like portions of said hinge means; and cooperating fulcrum means on said hinge means and pin providing a rockable engagement therebetween, eccentric to the axis of said pin.

2. In a flexible fastener of the character described, the combination with interdigitated loop-like hinge means adapted to be secured to the opposite ends of a flexible power transmitter; of a single connecting pin extending through the loop-like portions of said hinge means; and cooperable rockable fulcrum formations integrally formed on said pin and hinge means respectively, said formations having the pivotal axes thereof eccentric to the axis of the pin.

3. In a flexible fastener of the character described, the combination with interdigitated loop-like hinge means adapted to be secured to the opposite ends of a flexible power transmitter; of a single connecting pin extending through the loop-like portions of said hinge means; and means providing a rockable bearing between said pin and each of the sets of hinge means, the pivotal axes of which are eccentric to the axis of the pin.

4. In a flexible fastener of the character described, the combination with interdigitated loop-like hinge means adapted to be secured to the opposite ends of a flexible power transmitter; of a single connecting pin extending through the loop-like portions of said hinge means; means providing a rockable engagement between said pin and hinge means; and cooperable means on said pin and hinge means preventing endwise movement of the pin when the fastener is under tension.

5. As an article of manufacture, an integral hinge pin for fasteners for flexible belts, conveyors and the like, said pin having concave bearing seats extending lengthwise on opposite sides thereof and adapted to cooperate with lesser radius bearing portions of opposed hinge means.

6. As an article of manufacture, a hinge pin for fasteners for flexible belts, conveyors and the like, said pin having a concave bearing seat extending lengthwise thereof and adapted to cooperate with a lesser radius convex bearing portion of the hinge means and provided also with longitudinally spaced shoulders adapted to seat between portions of loop-like hinge means.

7. A fastener for belts and the like comprising: Two sets of means each adapted to be attached to one end of the belt or the like and having hinge loops extending lengthwise of the belt, one set of loops alternating with those of the other set, each loop having an inwardly offset convex section; and an insertable and removable hinge pin connecting the two sets of means and having concave bearing seats extended lengthwise thereof and of greater radius than and cooperable with the corresponding opposed loop convex sections, said pin having also lugs spaced lengthwise thereof and adapted to be positioned between loops to thereby prevent longitudinal displacement of the pin when the fastener is under tension.

8. A fastener for belts and the like comprising: Two sets of means, each set adapted to be attached to one end of a belt and having hinge loops extending lengthwise of the belt and alternating with those of the other set, each loop having an inwardly offset convex bearing section; and an insertable and removable single hinge pin connecting said two sets of means, said pin having concave bearing seats extending along the opposite sides thereof and of greater radius than and cooperable with the corresponding opposed loop convex sections; and means for preventing endwise movement of said pin when the fastener is under tension.

9. As an article of manufacture, a metal hinge member for belt fasteners and the like, said member having initially formed, diverging jaws with clinching prongs adjacent the free ends thereof, and a connecting section at the apex, the connecting section of the member having an inwardly extended convex offset on the inner side to provide a rounded bearing seat.

10. As an article of manufacture, a strip of metal belt lacing comprised of a plurality of longitudinally spaced diverging jaw sections having clinching prongs at the free ends of the jaw sections and a connecting portion at the apex, the sets of jaws being integrally connected by narrow bands adapted to be broken, whereby the length of the strip may be made to correspond to belts of different widths, the connecting section at the apex portion of each jaw section having an inwardly extended convex offset on the inner side thereof of relatively short radius to provide a rounded bearing seat.

11. A fastener for belts and the like comprising: Two sets of means each adapted to be attached to one end of the belt or the like and having somewhat elongated hinge loops extending lengthwise of the belt, the loops of one set alternating with those of the other set; an insertable and removable hinge pin connecting the two sets of means; means providing rockable bearings between the hinge pin and the loops of each set, said means comprising rounded bearing seats on opposite sides of the pin and rockable rounded bearing seats at the apex portions of the loops, the radii of the pin seats being different from the radii of the loop seats; and means preventing lengthwise displacement of the pin when the fastener is under tension.

12. In a flexible fastener of the character described, the combination with interdigitated loop hinge means adapted to be secured to opposite ends of a flexible power-transmitting element; of an integral hinge pin extending through and connecting the looplike portions of said hinge means, said pin having longitudinally extending bearing surfaces on opposite sides thereof, said bearing surfaces being concave, and said loop portions of the hinge means having convex bearing projections cooperating with the respective concave bearing surfaces of the pin to provide for rocking connection between the pin and loop hinge means.

In witness that I claim the foregoing I have hereunto subscribed my name this 5th day of November, 1928.

JOHN CONRAD OLSEN.